United States Patent
Yamada et al.

(10) Patent No.: US 6,426,988 B2
(45) Date of Patent: Jul. 30, 2002

(54) IMAGE PROCESSING METHOD OF X-RAY CT, X-RAY CT AND X-RAY CT IMAGE-TAKING RECORDING MEDIUM

(75) Inventors: Yosihiro Yamada, Kyoto; Yoshihiro Ueno, Kusatsu, both of (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/826,317

(22) Filed: Apr. 5, 2001

(30) Foreign Application Priority Data

Apr. 7, 2000 (JP) ........................................ 2000-106271

(51) Int. Cl.[7] ................................................. A61B 6/03

(52) U.S. Cl. ................................. 378/4; 378/8; 378/901

(58) Field of Search ........................... 378/4, 8, 15, 19, 378/901

(56) References Cited

U.S. PATENT DOCUMENTS 6,002,738 A * 12/1999 Cabral et al. .................. 378/15

* cited by examiner

Primary Examiner—David V. Bruce
(74) Attorney, Agent, or Firm—Kanesaka & Takeuchi

(57) ABSTRACT

In an image processing, a high-absorber area is set and weighting is carried out according to a length of a path through which X-rays pass in the high-absorber area, so that estimated image taking data at a portion where X-rays pass through the high-absorber area in considering a weight is obtained. Measured projection data at the portion where X-rays pass through the high-absorber area is replaced by data according to overwriting estimated projection data obtained by forward projecting the estimated image to correct and reconstitute the measured projection data. Thus, there can be obtained a corrected fault image having a reduced artifact and a high contrast, and considering the weight in the high-absorber area. Therefore, the artifact formed on the fault image due to absorption or dispersion of X-rays by an X-ray high-absorber, such as metal, can be reduced.

6 Claims, 11 Drawing Sheets

Fig. 7(a)
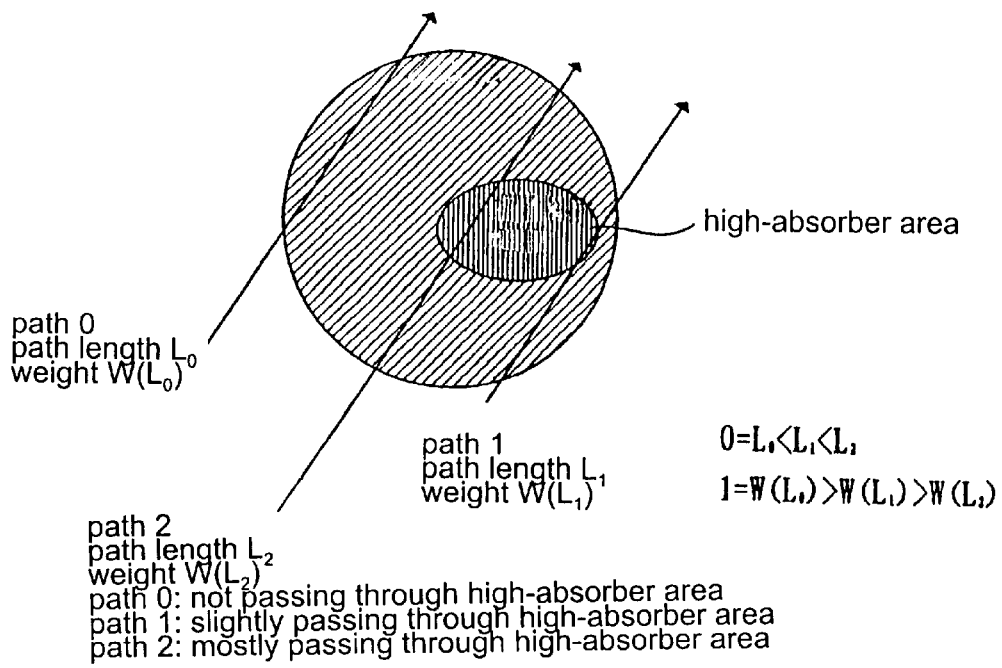
high-absorber area
path 0
path length $L_0$
weight $W(L_0)^0$
path 1
path length $L_1$
weight $W(L_1)^1$
path 2
path length $L_2$
weight $W(L_2)^2$
$0 = L_0 < L_1 < L_2$
$1 = W(L_0) > W(L_1) > W(L_2)$
path 0: not passing through high-absorber area
path 1: slightly passing through high-absorber area
path 2: mostly passing through high-absorber area
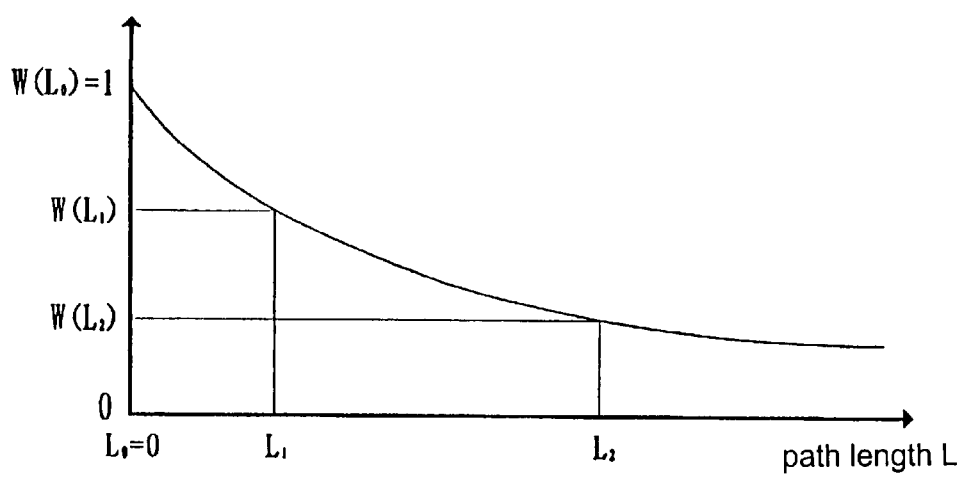
Fig. 7(b)

IMAGE PROCESSING METHOD OF X-RAY CT, X-RAY CT AND X-RAY CT IMAGE-TAKING RECORDING MEDIUM

BACKGROUND OF THE INVENTION AND RELATED ART STATEMENT

The invention relates to an image processing method of an X-ray CT, an X-ray CT, and an X-ray CT image-taking recording medium, especially, to a technique for reducing a false image or artifact by absorption or dispersion of X-rays by an X-ray high-absorber, such as metal.

Generally, as shown in FIG. 8(a), an X-ray CT includes an X-ray tube 51 for generating an X-ray beam B and an X-ray detector 52 for detecting X-rays. The X-ray tube 51 and the X-ray detector 52 are disposed to sandwich an object P to be tested, and the X-ray tube 51 irradiates the X-ray beam B to the object P to be tested to take images while rotating around an axis Z of the object P (in a direction extending vertically with respect to a sheet surface in FIG. 8(a)). Generally, the X-ray detector 52 includes a plurality of detecting elements CHi (i=1, 2 . . . , n−1, n wherein n is a natural number), and the detecting elements CHi are disposed in a fan shape every fine angle. (FIG. 8(a))

In a conventional image processing method, X-rays are irradiated from the circumference of the object P to be tested to obtain X-ray transmission data f(P) on a projection plane U (FIG. 8(b)). Incidentally, in the present specification, the X-ray irradiation is referred to as "the object P to be tested is projected in an irradiation direction of the X-ray beam B" (hereinafter, also abbreviated to "the object P to be tested is projected"). The X-ray transmission data f(P) obtained on the projection plane U at this time is also referred to as "measured projection data f(P)". Further, the measured projection data f(P) on the projection plane F is subjected to a reconstruction process, such as filtering and backprojection, to obtain an original image G[f(P)] on an image plane V (FIG. 8(c)). In the present specification, the filtering is defined such that a convolution integral calculus (superposition integral calculus) is carried out by using a convolution kernel function. Also, the method where the projection data is subjected to the reconstruction process, such as filtering and backprojection, is generally known as a filtered backprojection (hereinafter referred to as FBP) method. Incidentally, since the FBP method is one of representative reconstruction processing methods, explanation thereof is omitted. By the way, derivation of the projection data of an image by using a mathematical algorithm is called as "forward projecting the image in an irradiation direction of X-rays" (hereinafter, if applicable, abbreviated as "forward projecting the image").

Incidentally, a row of the detecting elements $CH_i$ and a row of angles θ in an irradiation direction of X-ray beam B are shown in a horizontal axial direction and in a vertical axial direction on the projection plane U, respectively. Also, hatching areas in the projection plane U and the image plane V are shown illustratively. Further, the projection plane U and image plane V show areas. Based on the above, the following explanation is provided.

Incidentally, in case a certain object is represented by "P", the projection of the object P is indicated by f(P); in case a fault image is represented by "α", the forward projection of the fault image α is indicated by F(α); and in case certain projection data is represented by "β", the fault image obtained by filtered and backprojection of the projection data β, i.e. the image reconstituted by the FBP method is indicated by B[H(β)] or G(β). At this time, it is assumed that an operation of the backprojection is represented by "B"; an operation of the filtering is represented by "H"; and an operator of the backprojection and filtering is represented by "G". Also, in order to make distinction between the projection of the object to be tested and the forward projection of the image, the symbols with respect to the projection and the forward projection are represented by "f" and "F". Further, since there is a measurement error, in case the projection data β is measured, even if the fault image obtained by the FBP method of the measured projection data β is forward projected, the forward projected fault image does not return to exactly the same data as the originally measured projection data β. Therefore, in the present specification, assuming that β=F[G(β)] does not hold, the following explanation is made. Incidentally, the projection data (including also the measured projection data f(P)) and the image (including also the measured fault image G[f(P)]) have numeral weights, different from the projection plane F and the fault plane G, in other words, they are dealt as pixel values in the following explanations of the present specification.

However, in case of the conventional image process method, there are the following problems.

In detail, when a reconstruction of the image is carried out by taking an image of an object to be tested, false images are generated. Especially, in case of taking an image of an object to be tested including a high-absorber consisting of a metal or the like, the false images generated at and around the high-absorber become conspicuous due to absorption or dispersion by the high-absorber. Hereinafter, in the present specification, the above-explained false image is called as "artifact". In the false images, especially, there are known streak artifacts where radially striped patterns are generated around the high-absorber, and shading artifacts which are generated at portions sandwiched by a plurality of high-absorbers. In order to reduce the artifacts including the above-mentioned artifacts, various methods have been proposed. As representative reducing methods, there are mentioned an iterative reconstruction and reprojection (hereinafter referred to as "IRR") method, and algebraic reconstruction technique/expectation and maximization (hereinafter referred to as "ART/EM") method.

First, the IRR method is explained with reference to FIG. 9. In the IRR method, an original fault image G[f(P)] on the fault plane V obtained by a conventional image processing method is again forward projected by a mathematical algorithm in an irradiation direction of X-rays to obtain forward projection data F(G[f(P)]) on the projection plane U. Then, an operator sets a portion corresponding to a high-absorber as a high-absorber area M on the image plane V with reference to the original fault image G[f(P)] on the fault plane G ((a) in FIG. 9). Incidentally, the high-absorber area M is a closed area. A portion L where X-rays pass through the high-absorber area is formed in the projection plane U. A pixel value of the measured projection data f(P) with respect to the portion L where X-rays pass through the high-absorber area is replaced by a pixel value of the forward projection data F(G[f(P)]) or a pixel value derived from the forward projection data F(G[f(P)]) to correct the measured projection data f(P) and obtain a corrected projection data $F(P_1)$. It should be noted that the forward projection data F(G[f(P)]) is different from the corrected projection data $F(P_1)$ ((b) in FIG. 9) Further, reconstruction of the corrected projection data $F(P_1)$ is carried out again to obtain a corrected fault image $G[F(P_1)]$ on the image plane V. ((c) in FIG. 9)

Incidentally, "the pixel value of the measured projection data f(P) of the portion L where X-rays pass through the high-absorber area is replaced by the pixel value of correcting forward projection data F(G[f(P)])" means that the corrected projection data F(P₁) is obtained by following equations (1) and (2).

In the portion where X-rays do not pass through the high-absorber area:

$$F(P_1) = f(P) \quad (1)$$

In the portion L where X-rays pass through the high-absorber area:

$$F(P_1) = F(G[f(P)]) \quad (2)$$

Incidentally, "the pixel value of the measured projection data f(P) of the portion L where X-rays pass through the high-absorber area is replaced by the pixel value derived from the correcting forward projection data F(G[f(P)])" can be obtained by equations (3) and (4) mentioned below.

In the portion where X-rays do not pass through the high-absorber area:

$$F(P_1) = f(P) \quad (3)$$

In the portion L where X-rays pass through the high-absorber area:

$$F(P_1) = \alpha \times F(G[f(P)]) \quad (4)$$

In other words, the pixel value of the measured projection data f(P) of the portion L where X-rays pass through the high-absorber area is replaced by a value obtained by multiplying the forward projection data F(G[f(P)]) of the portion L where X-rays pass through the high-absorber area at predetermined times ($\alpha$ times).

By the above-stated method, in the portion L through which X-rays pass in the high absorber area, the pixel value of the forward projection data F(G[f(P)]) or the pixel value derived from the forward projection data F(G[f(P)]) passing through the high-absorber area is utilized, instead of the pixel value of the measured projection data f(P). Therefore, in the portion where X-rays do not pass through the high-absorber area, the pixel value of the measured projection data f(P) is left as it is, while in the portion L where X-rays pass through the high-absorber area, data obtained by subjecting to the filtered, backprojection (reconstruction by the FBP method) process and the forward projection is replaced therewith. Here, in the portion L where X-rays passes through the high-absorber area, the correcting forward projection data F(G[f(P)]) is more accurate than the measured projection data f(P) as the data. Therefore, in the corrected projection data F(P₁), the forward projection data F(G[f(P)]) to reduce the artifact portion is used. However, in the IRR method, since it is required that the correction data should be very accurate, the effects are limited and reduction effects are poor. On the other hand, as a method where the reduction effect of the artifact is high, there is an ART/EM method.

Next, the ART/EM method is explained with reference to FIGS. 10 and 11. FIG. 10 is a drawing showing a process for obtaining an estimated image $b_1$ by overwriting an initial image $b_0$ one time; and FIG. 11 is a drawing showing a process for obtaining an estimated image $b_{k+1}$ by further overwriting or amending, one time, an estimated image $b_k$ obtained by overwriting the initial image $b_0$ plural times (in this case, k times). Incidentally, $b_0$ in FIG. 10 is an estimated image initialized by an arbitrary positive value, and $b_1$ is an initial image obtained by overwriting the initial image $b_0$ one time. Also, $b_k$ in FIG. 11 is an estimated image obtained by overwriting the estimated image $b_0$ k times, and $b_{k+1}$ is an estimated image obtained by overwriting the estimated image $b_0$ (k+1) times.

As shown in FIG. 10, in the specific example of the ART/EM method, the initial image $b_0$ is set. The initial image $b_0$ can be set with an arbitrary positive value by an operator. For example, the pixel values of X-rays on the whole area may be the same. Then, the operator sets a portion corresponding to the high-absorber as a high-absorber area M on the image plane V referring to a measured fault image G[f(P)] on the image plane V ((a) in FIG. 10) Then, a portion L where X-rays pass through the high-absorber area is formed on the projection plane U. The initial image $b_0$ is forward projected to obtain estimated projection data F($b_0$) on the projection plane U. Then, the obtained estimated projection data F($b_0$) is compared with the measured projection data f(P) ((b)in FIG. 10). When compared, the portion L where X-rays pass through the high-absorber area is disregarded and not compared. In other words, with respect to a portion where X-rays do not pass through the high-absorber area, the estimated projection data F($b_0$) is compared with the measured projection data f(P). This is also applied to the overwritten, described later, wherein overwriting of the estimated image is carried out only for the portion where the high-absorber does not exist.

Incidentally, in the ART method, the measured projection data f(P) and the estimated projection data F($b_0$) are compared, and a difference of both data is backprojected to obtain a comparison reference image. With the comparison reference image, the initial image $b_0$ is overwritten. On the other hand, in the EM method, a ratio of the measured projection data f(P) with respect to the estimated projection data F($b_0$) is backprojected to obtain a comparison reference image. In the same manner, with the comparison reference image, the estimated image $b_0$ is overwritten. By the above-stated method, the initial image overwritten one time becomes an estimated image $b_1$ ((c) in FIG. 10). With reference to the pixel values of the portion L where X-rays pass through the high-absorber area, as described before, comparison of both projection data and overwriting are not carried out and disregarded. Thus, the data of the pixel values of the portion L has no definition nor distinction.

In the same manner as in the overwriting method of the initial image $b_0$, the estimated image f($b_1$) is compared with the measured projection data f(P) to overwrite the estimated image $b_1$. Thereafter, in the same manner, the initial image is overwritten plural times to obtain an intended fault image. More specifically, when the overwriting of the estimated image $b_x$ is carried out, as shown in FIG. 11, the estimated image f($b_x$) is compared with the measured projection data f(P) to derive or obtain an estimated image $b_{k+1}$.

In the image obtained by the above-described methods, higher effects are obtained for reducing the artifact portion when compared with that of the IRR method. Especially, the reduction effects of the streak artifact are conspicuous in the ART/EM method. However, in the ART/EM method, as described before, since the portion L where X-rays pass through the high-absorber area is disregarded when the comparison between the projection data and overwriting is carried out, data regarding the high-absorber is not defined. Therefore, there is a defect wherein the shapes of the high-absorber itself and its circumference are not reproduced. Also, in case the number of times by which the overwritings of the estimated images are carried out, i.e. repetition times, is small, it only an image having a low contrast can be obtained, which results in a poor resolution. In order to obtain a high contrast fault image, the number of times by which the estimated images are renewed, i.e. repetition times, should be increased.

In view of the above problems, the present invention has been made and an object of the invention is to provide an image processing method of X-ray CT, X-ray CT and X-ray CT image-taking recording medium for reducing artifact on a fault image caused by absorption or dispersion by a high-absorber.

Further objects and advantages of the invention will be apparent from the following description of the invention.

SUMMARY OF THE INVENTION

In the ART/EM method, as described above, since the portion where X-rays pass through the high-absorber area is disregarded, shapes of the high-absorber itself and the circumference thereof can not be reproduced. Therefore, the ART/EM method considering the portion relating to the high-absorber is desired. However, in case the data of the portion where X-rays pass through the high-absorber area is used as it is, reduction effects of the artifact can not be obtained. Therefore, there is considered an ART/EM method wherein weighting is carried out according to a length through which X-rays pass in the high-absorber area (hereinafter, abbreviated as "weighted ART/EM method").

Also, in the weighted ART/EM method, since the portion where X-rays pass through the high-absorber is considered, the reduction effect of the artifact is reduced when the repetition times are increased. In other words, when the repetition times are small, although the artifact portion is reduced, only low contrast image can be obtained. On the contrary, when the repetition times are large, although a high contrast image can be obtained, the reduction effect of the artifact is lowered. However, in the IRR method, when measured projection data of the portion where X-rays pass through the high-absorber area is replaced by the forward projection data with reduced artifact obtained by the weighted ART/EM method when the number of repetition times is small to thereby correct the measured projection data, and then a reconstruction process is further carried out by the FBP method or ART/EM method to obtain a high contrast image with reduced artifact.

Thus, the present inventors had an idea such that in addition to the combination of the IRR method and the weighted ART/EM method, further, when a reconstruction process is carried out by the FBP method or ART/EM method, a corrected image with reduced artifact can be obtained.

The present invention based on the above-described knowledge and information has the following structure.

In an image processing method according to a first aspect of the invention, a processing method obtains a fault image by reconstructing image data obtained when an image is taken by an X-ray CT. The image processing method includes (1) an image-taking process wherein measured projection data can be obtained by irradiating X-rays from a circumference of an object to be tested and detecting the X-rays passing through the object to be tested; (2) a first image reconstructing process for subjecting the measured projection data obtained in the image-taking process to filtering and then backprojecting to thereby reconstruct an original image; (3) an initial image setting process for initializing or setting an estimated image with an arbitrary positive value; (4) a high-absorber area setting process for setting a high-absorber area based on the original fault image derived from the first image reconstructing process; (5) an estimated projection data derivation process for deriving estimated projection data by forward projecting the estimated image in an X-ray irradiation direction; (6) a comparison reference image deriving process for deriving or obtaining a comparison reference image by backprojecting a difference or a ratio between the estimated projection data and the measured projection data; (7) a weighted comparison reference image deriving process for deriving or providing a weighted comparison reference image weighted such that as a path through which X-rays pass in the high-absorber area becomes longer, the respective pixel values of the comparison reference image become smaller; (8) an estimated image overwriting process for overwriting the estimated image by the weighted comparison reference image; (9) a repeating operation process for overwriting an estimated image where an artifact is reduced by repeatedly carrying out, one time or plural times, the above-stated respective processes from (5) to (8) according to degrees of the artifact appearing on the estimated image overwritten at the estimated image overwriting process; (10) an overwritten estimated projection data deriving process for deriving or providing overwritten estimated projection data through the forward projection of the estimated image overwritten at the repeating operation process; (11) a measured projection data correction process for replacing the measured projection data of the portion where X-rays pass through the high-absorber area with the data according to the overwritten estimated projection data to correct the measured projection data; and (12) a second image reconstructing process for reconstructing the image of the corrected measured projection data to derive the fault image.

In an X-ray CT according to a second aspect of the invention, an X-ray CT obtains a fault image by reconstructing image data obtained when an image is taken by the X-ray CT. The X-ray CT includes (a) an X-ray irradiation device for irradiating X-rays from the circumference of an object to be tested; (b) an X-ray detecting device for obtaining measured projection data by detecting X-rays passing through the object to be tested by irradiation of X-rays by the X-ray irradiation device; (c) a first image reconstructing device for reconstructing the measured fault image by subjecting the measured projection data obtained by the X-ray detecting device to filtering and then backprojecting the filtered measured projection data; (d) an estimated image setting device for initializing or setting an estimated image with an arbitrary positive value; (e) a high-absorber area setting device for setting a high-absorber area based on the measured original image derived from the first image reconstructing device; (f) an estimated projection data deriving device for deriving estimated projection data by forward projecting the estimated image in the X-ray irradiation direction; (g) a comparison reference image deriving device for deriving a comparison reference image by backprojecting a difference or a ratio between the estimated projection data and the measured projection data; (h) a weighted comparison reference image deriving device for deriving a weighted comparison reference image weighted such that the pixel values of the comparison reference image become smaller as a path through which X-rays pass in the high-absorber area become longer; (i) an estimated image overwriting device for overwriting the estimated image by the weighted comparison reference image; (j) a repeating operation device for overwriting to an estimated image wherein the artifact is reduced by repeatedly carrying out processes, one time or plural times, by the respective devices from (f) to (i) according to a degree of the artifact appearing on the estimated image overwriting by the estimated image overwriting device; (k) a overwritten estimated projection data deriving device for deriving the overwritten estimated projection data by forward projecting the estimated image overwritten by the repeating operation device; (1) a measured projection data correcting device for correcting the measured projection data by replacing the measured projection data of the portion where X-rays pass through the high-absorber area by the data according to the overwritten estimated projection data; and (m) a second image reconstructing device for deriving a fault image by reconstructing an image of the corrected measured projection data.

In an X-ray CT image-taking recording medium according to a third aspect of the invention, a computer-readable X-ray CT image-taking recording medium is obtained, wherein a program for executing the image process method, mentioned in the first aspect of the invention, and read by a computer is recorded.

A function of the invention described in the first aspect is explained.

According to the image process method of the invention, by setting of a high-absorber area, an estimated image considering the high-absorber area can be obtained. Through comparison of the measured projection data and estimated projection data obtained by the forward projection of the estimated image in the X-ray irradiation direction, a comparison reference image is derived based on the backprojection of a difference or a ratio between the data mentioned above. The comparison reference image is weighted according to the path, i.e. length, through which X-rays pass in the high-absorber area. Thus, the weighted comparison reference image is overwritten to an estimated image having the reduced artifact caused by dispersion or reflection of the high-absorber area. The overwritten estimated image of the high-absorber area and overwritten estimated projection data obtained by forward projecting the overwritten estimated image in the X-ray irradiation direction have reduced artifact. The measured projection data at the portion where X-rays pass through the high-absorber area is replaced by the data according to the overwritten estimated projection data to reconstruct the measured projection data through the correction thereof. Thus, a corrected image having a high contrast and reduced artifact can be obtained.

According to the invention described in the second aspect, the method of the invention of the first aspect can be favorably carried out, so that a corrected image having a reduced artifact and a high contrast can be obtained.

According to the invention described in the third aspect, the method of the invention described in the first aspect is carried out by a computer to thereby obtain a corrected image having a reduced artifact and a high contrast.

BRIEF DESCRIPTION OF THE DRAWINGS

FIG. 7(a) is a drawing showing a relationship between positions of paths through which X-rays pass in a high-absorber and weights in the weighted ART/EM method;

FIG. 7(b) is a graph showing weight functions with respect to path lengths;

DETAILED DESCRIPTION OF PREFERRED EMBODIMENTS

Before the embodiments according to the present invention are explained, a theory of the invention is explained with reference to FIG. 1.

Figure 1:
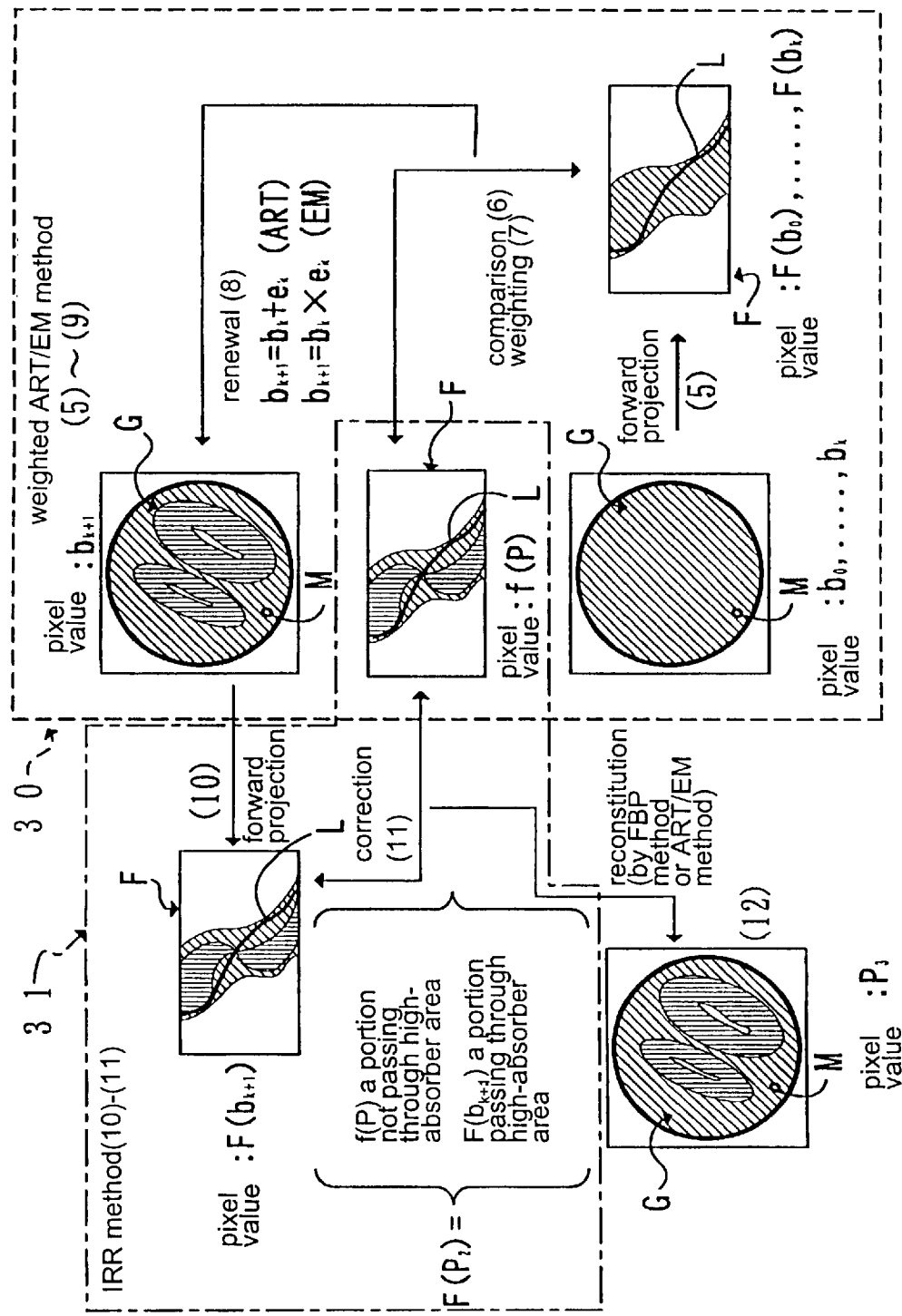
FIG. 1 is a drawing showing a flow until a finally obtained corrected image is derived or obtained in the present invention.

FIG. 1 roughly shows a flow until a final corrected image is derived in the present invention. First, X-rays are irradiated to an object P to be tested from the circumference thereof and the X-rays passing therethrough are detected to thereby obtain a measured projection data f(P) on a projection plane F. In the present specification, the process is also referred to "the object P to be tested is projected in an irradiation direction of the X-rays", (hereinafter, according to circumstances, briefly mentioned as "the object P to be tested is projected"). Incidentally, as mentioned in the explanation of the conventional example, "projection data of a certain image is derived by using mathematical algorithm" is called "the image is forward projected". The measured projection data f(P) obtained by projecting the object P to be tested in the irradiation direction of X-rays is subjected to a reconstruction process by an FBP method to thereby obtain an original fault image G[f(P)] on an image plane G. In the present specification, this process is called as "the measured projection data f(P) is subjected to filtering to backproject". By the way, in case the fault image is obtained by subjecting not only the measured projection data f(P) but also the other projection data to the reconstruction process by the FBP method, in the present specification, the process is also called as "the projection data is subjected to filtering to backproject".

Next, an initial image $b_0$ is set. The initial image $b_0$ can be initially set by an operator with an arbitrary positive value as described above with reference to the conventional ART/EM method. For example, pixel values of X-rays in the whole area may be made uniform. Also, an artifact is produced on the image plane G due to absorption or dispersion of X-rays by a high-absorber. The operator sets a portion corresponding to the high-absorber, which causes the artifact, as a high-absorber area M on the image plane G. Thus, a portion L where X-rays pass through the high-absorber area M is produced on the projection plane F.

As shown in FIG. 1, when the initial image $b_0$ is forward projected, an estimated projection data $F(b_0)$ is derived on the projection plane F. The measured projection data f(P) and the estimated projection data $F(b_k)$ (in case no overwriting is made, the initial projection data is $F(b_0)$) are compared with each other to derive a comparison reference image $d_k$ (in case no overwriting is made, the comparison reference image is $d_0$) based on the backprojection of a difference or ratio between both data. Incidentally, the above estimated projection data $F(b_k)$ is obtained through the forward projection of the estimated image $b_k$ which is obtained by overwriting the initial image $b_0$ by k times. The overwriting method will be described later in detail. Further, the comparison reference image $d_k$ (in case no overwriting is made, the comparison reference image is $d_0$) is weighted according to a length where X-rays pass through the high-absorber area to thereby derive a weighted comparison reference image $e_k$ (in case no overwriting is made, the weighted comparison reference image is $e_0$). The estimated image $b_k$ is overwritten by the weighted comparison reference image $e_k$ (in case no overwriting is made, the weighted comparison reference image is $e_0$) to obtain an estimated image $b_{k+1}$ (in case the initial image $b_0$ is overwritten, the estimated image is $b_1$). In other words, this is an overwriting. The weighted ART/EM method includes processes from derivation of the initial projection data $F(b_0)$ to the overwriting to the estimated image $b_{k+1}$. The processes denoted by reference numeral 30 surrounded by broken lines shown in FIG. 1 correspond to the weighted ART/EM method.

The overwritten estimated image $b_{k+1}$ is forward projected to obtain an overwritten estimated projection data $F(b_{k+1})$. The pixel values of the measured projection data f(P) in the portion L where X-rays pass through the high-absorber area is replaced by the pixel values according to the overwritten estimated projection data $F(b_{k+1})$ to correct the measured projection data f(P) and derive or obtain a corrected projection data $F(P_2)$. The IRR method includes the processes until the derivation of the corrected projection data $F(P_2)$. The processes denoted by reference numeral 31 surrounded by single-dotted chain lines shown in FIG. 1 correspond to the IRR method.

The corrected projection data $F(P_2)$ is reconstructed by the FBP method, ART/EM method or the like to obtain a corrected image $P_3$. The corrected image $P_3$ is the finally obtained corrected image. Incidentally, the image reconstructing method carried out by the second image reconstructing process or the second image reconstructing device includes the image reconstructing method by not only the FBP method but also the ART/EM method (including the weighted ART/EM method).

Figure 2:
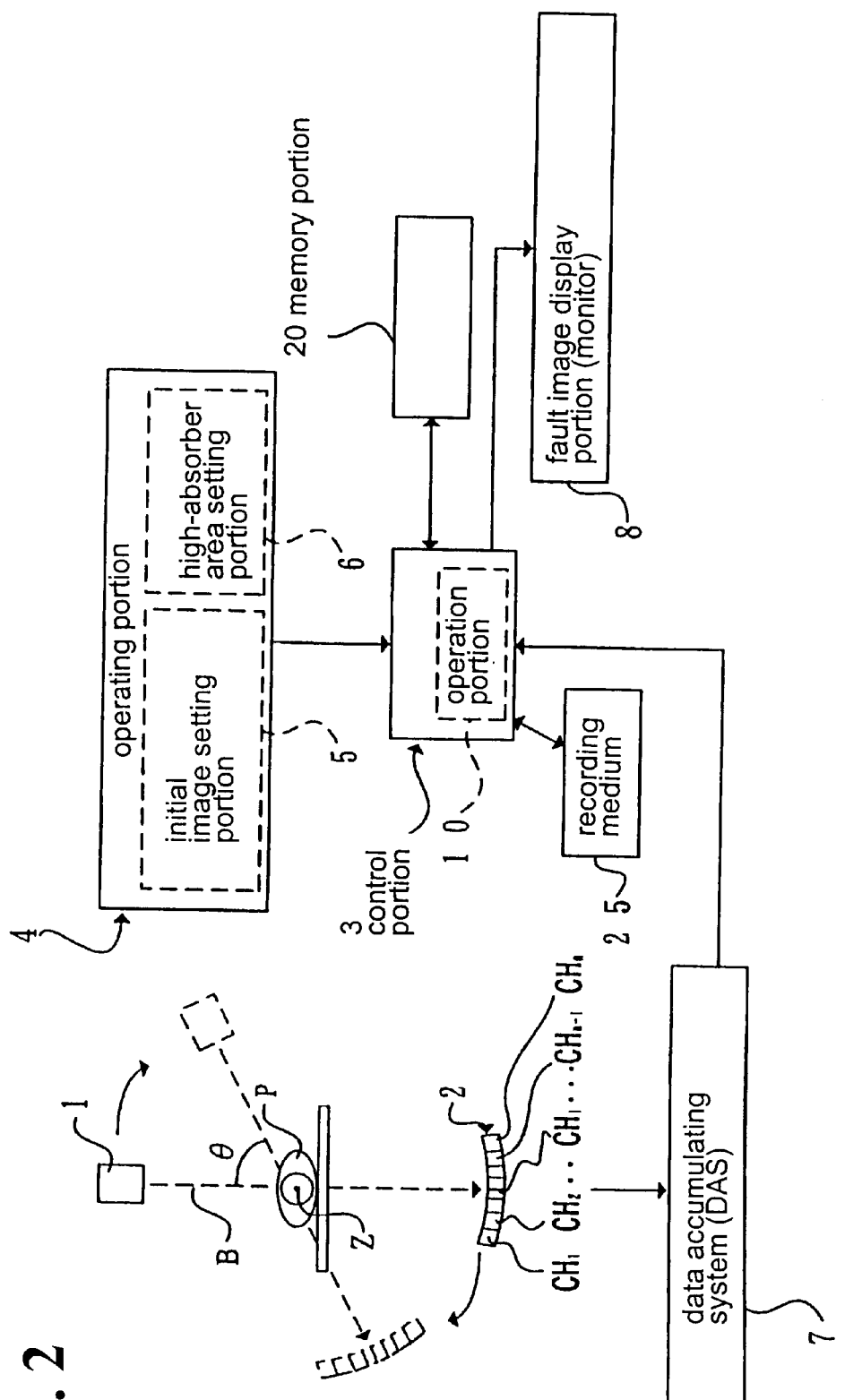
FIG. 2 is a block diagram showing an essential structure of an X-ray CT of an embodiment.
Figure 3:
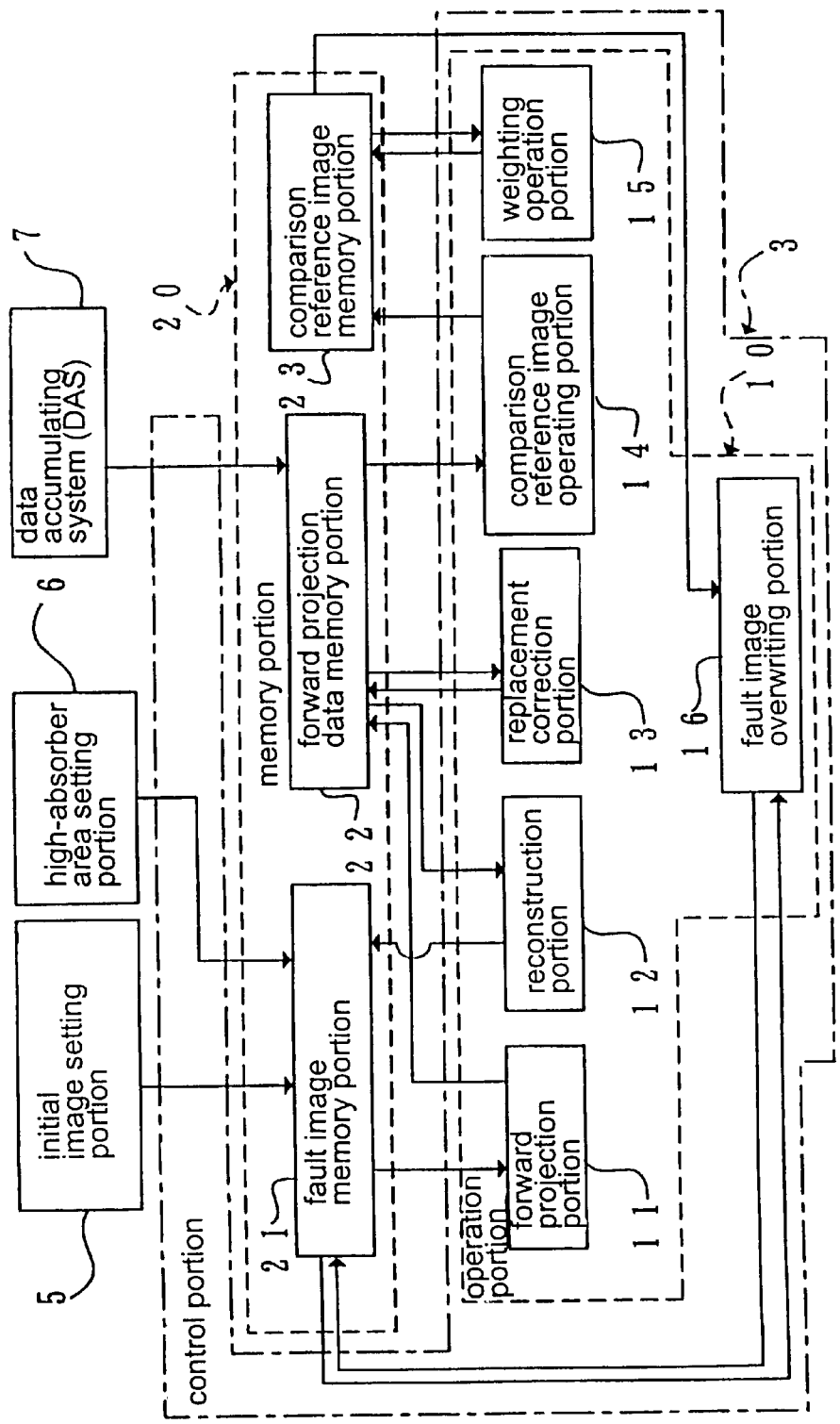
FIG. 3 is a block diagram specifically showing an operation portion and a memory portion.

Next, the essential structures and operations of the embodiment of the X-ray CT according to the present invention are explained in detail with reference to block diagrams shown in FIGS. 2 and 3. FIG. 2 is a block diagram showing the essential structures of the X-ray CT of the present embodiment. FIG. 3 is a block diagram specifically showing inner portions of an operating portion and a memory portion, respectively.

Since functions and operations of the X-ray tube 1, X-ray detector 2 and detection elements $CH_1$ shown in FIG. 2, in the X-ray CT of the present embodiment, are the same as those explained in the prior art section, explanations thereof are omitted. In addition to the above, the X-ray CT of the present embodiment includes a control portion 3 including an operation portion 10 (including a central processing unit); an operating portion 4 including a mouse, key board, touch panel and the like for operating the control portion 3; a data accumulating system (DAS) 7; a fault image display portion or monitor 8; a memory portion 20 for storing coordinates of the projection plane F and the image plane G, the projection data and pixel values of the fault image; and a recording medium 25. The X-ray tube 1 corresponds to an X-ray irradiation device, and the X-ray detector 2 corresponds to the X-ray detecting device in the present invention.

An input operation of the operating portion 4 is carried out by an operator. Commands, such as reading out, writing-in and setting of data, are carried out at an operation portion 10 through the control portion 3. Also, the recording medium 25 stores a program for executing the processes of a flow chart shown in FIG. 3 to allow the program to be executed by the control portion 3 built in the computer. When the program is executed, the control portion 3 writes in and reads out from the memory portion 20 to allow the operation portion 10 to execute the operation process. Incidentally, the operating portion 4 includes an initial image setting portion 5 for initially setting an initial image $b_0$ with an arbitrary positive value, and a high-absorber area setting portion 6 for setting a portion corresponding to a high absorber, as a high-absorber area M, with reference to a measured fault image G[f(P)]. The pixel values of the initial image $b_0$ and the coordinates of the high-absorber area M set by the high-absorber area setting portion 6 are written in the memory portion 20 through the control portion 3. The initial image setting portion 5 corresponds to an initial image setting device, the high-absorber area setting portion 6 corresponds to a high-absorber area setting device, and the recording medium 25 corresponds to an X-ray CT image-taking recording medium, in the present invention, respectively. In the present embodiment, the high-absorber area setting portion 6 is structured such that the operator carries out the setting. However, the high-absorber area M may be automatically set according to the pixel values and the like of the measured fault image G[f(P)].

On the other hand, the data accumulating system 7 has a function for collecting the X-ray transmission data f(P) detected by the X-ray detector 2 as X-ray beams B are irradiated from the circumference of the object P to be tested. The X-ray transmission data f(P) collected by the data accumulating system 7, i.e. the measured projection data f(P), is written in the memory portion 20 through the control portion 3.

Next, specific structures of the operation portion 10 and the memory portion 20 are described in detail with reference to FIG. 3.

First, the specific structure of the operation portion 10 is explained. As shown in FIG. 3, the operation portion 10 includes a forward projection portion 11, reconstruction portion 12, replacement correction portion 13, comparison reference image operating portion 14, weighting operation portion 15 and fault image overwriting portion 16.

The forward projection portion 11 has a function for forward projecting a fault image on a image plane G (also including the high-absorber area M) read out from a fault image memory portion 21, described later, to derive or provide forward projection data on a projection plane F (also including the L portion where X-rays pass through the high-absorber area). The forward projection portion 11 corresponds to an estimated projection data deriving device and an overwriting estimated projection data deriving device of the present invention.

The reconstruction portion 12 has functions for providing filtering to the forward projection data on the projection plane F (also including a portion L where X-rays pass through the high-absorber area) read out from a forward projection data memory portion 22, described later, and then carrying out the backprojection to reconstruct so that the fault image is derived on the image plane G (also including the high-absorber area M). In other words, the reconstruction portion 12 means a device for reconstructing the fault image by the FBP method. The reconstruction portion 12 corresponds to a first image reconstructing device, and a portion of a second image reconstructing device (only in case the reconstruction is carried out by the FBP method) of the present invention.

The replacement correction portion 13 has a function for replacing the pixel values or the forward projection data of the portion L where X-rays pass through the high-absorber area read out from the forward projection data memory portion 22 with the pixel values or other forward projection data, or pixel values or data according to the latter forward projection data to thereby carry out corrections of the former forward projection data. The replacement correction portion 13 corresponds to a measured projection data correction device of the present invention.

The comparison reference image operating portion 14 has a function for comparing the forward projection data read out from the forward projection data memory portion 22 with other forward projection data to derive a comparison reference image $d_k$ obtained by backprojecting a difference or ratio between the data. The comparison reference image operating portion 14 corresponds to a comparison reference image deriving device of the invention.

The weighting operation portion 15 has a function for weighting the comparison reference image $d_k$ read out from the comparison reference image memory portion 23, described later, according to a length of an area where X-rays pass through the high-absorber. More specifically, the weighting is carried out such that as a path through which X-ray passes in the high absorber becomes longer, the respective pixel values of the comparison reference image $d_k$ become smaller. The weighting operation portion 15 corresponds to a weighting comparison reference image deriving device of the invention.

The fault image overwriting portion 16 has a function for overwriting the fault image read out from the fault image memory portion 21 by the weighted comparison reference image $e_k$ read out from the comparison reference memory portion 23. The fault image overwriting portion 16 corresponds to an estimated image overwriting device of the present invention.

Next, a specific structure of the memory portion 20 is explained. The memory portion 20, as shown in FIG. 3, includes a fault image memory portion 21, a forward projection data memory portion 22 and a comparison reference image memory portion 23.

The fault image memory portion 21 has writing and reading functions such that respective coordinates and pixel values of the fault image on the image plane G obtained from the reconstruction portion 12 and the fault image overwriting portion 16, the coordinates of the high-absorber area M set by the high-absorber area setting portion 6 and respective coordinates and pixel values of the initial image $b_0$ on the image plane G set by the estimated image setting portion 5 are written therein. If necessary, in other words, according to a reading command of the operating portion 4, respective coordinates and pixel values of the original image on the image plane G are read through the control portion 3. Incidentally, the read-out initial image on the image plane G is displayed on the fault image display portion 8. Then, the pixel values of the initial image are allowed to correspond to colors on the screen of the fault image display portion 8. For example, in case the pixel values of the initial image are small, the color on the screen is made lighter, and in case the pixel values of the initial image are large, the color on the screen is made darker so that shadings according to the pixel values are displayed on the fault image display portion or monitor 8.

The forward data memory portion 22 has writing and reading functions such that the respective coordinates and pixel values of X-ray transmission data f(P) (measured projection data f(P)) of the object P to be tested on the projection plane F collected by the data accumulating system 7 and the respective coordinates and pixel values of the forward projection data on the projection plane F obtained from the forward projection portion 11 and the replacement correction portion 13 are written therein, and if necessity, the respective coordinates and pixel values of the forward projection data on the projection plane F are read. Incidentally, in the present embodiment, the respective coordinates and pixel values of the forward projection data on the projection plane F are not displayed on the monitor. However, the respective coordinates and pixel values of the read-out forward projection data on the projection plane F may be displayed on a monitor for the forward projection data, or a superposition display may be made on the fault image display portion or monitor 8.

The comparison reference image memory portion 23 has writing and reading functions such that the pixel values of a comparison reference image $d_k$ obtained from the comparison reference image operating portion 14 and the pixel values of a weighted comparison reference image $e_k$ obtained from the weighing operation portion 15 are written therein, and if necessary, the pixel values of the comparison reference images thereof are read.

Figure 4:
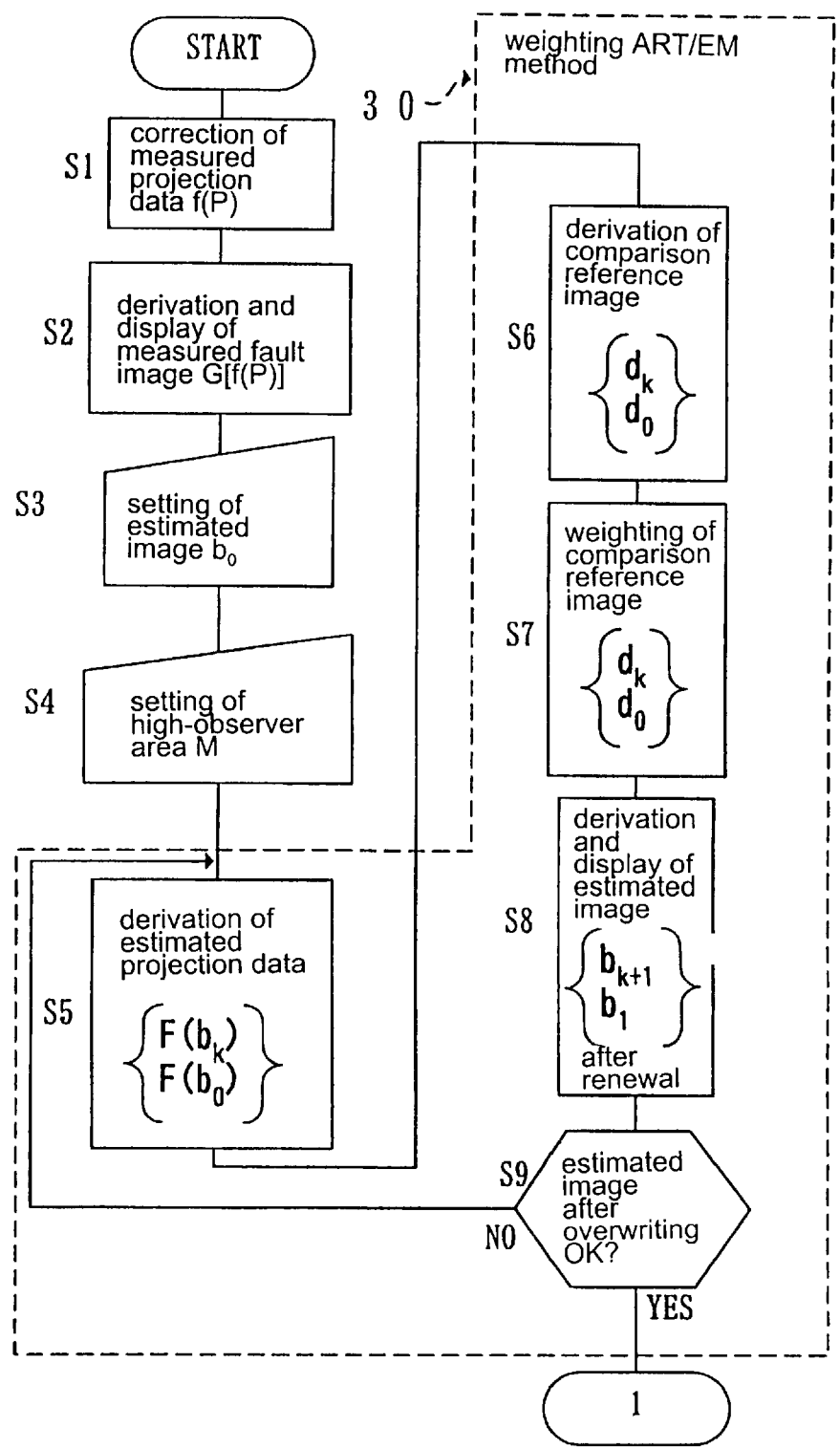
FIG. 4 is a flow chart showing a flow from a start of image-taking until a low contrast image is obtained (first half portion)
Figure 5:
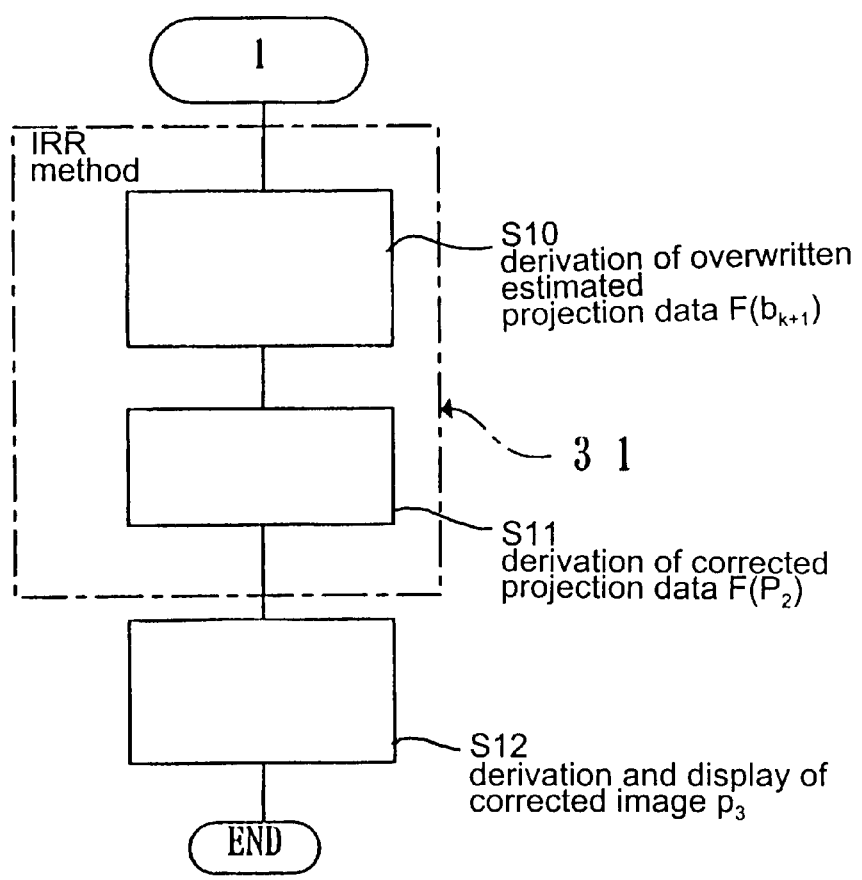
FIG. 5 is a flow chart showing a flow from a start of image-taking until the corrected image is obtained (second half portion)
Figure 6:
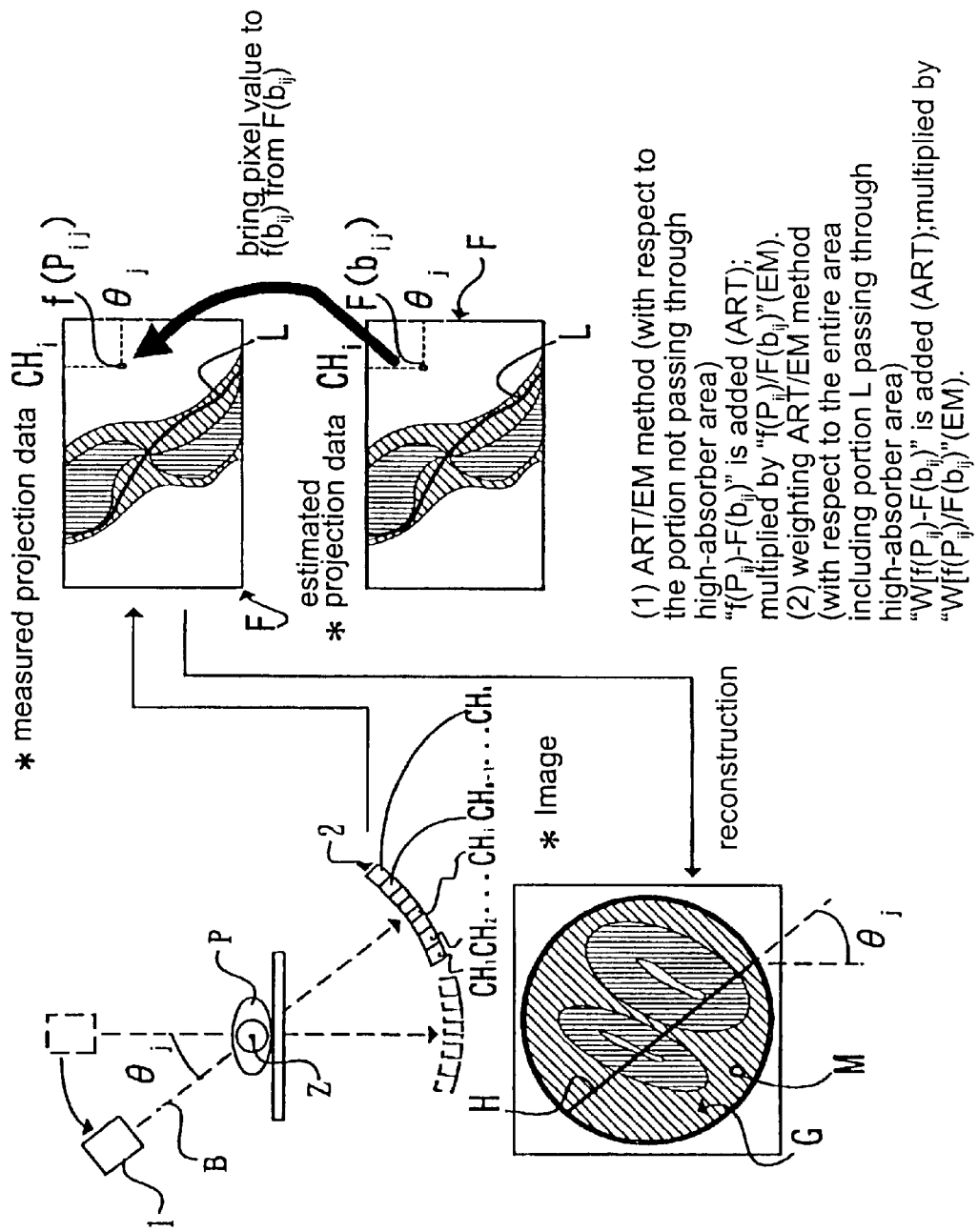
FIG. 6 is a drawing specifically showing an ART/EM method and a weighted ART/EM method.
Figure 8A:
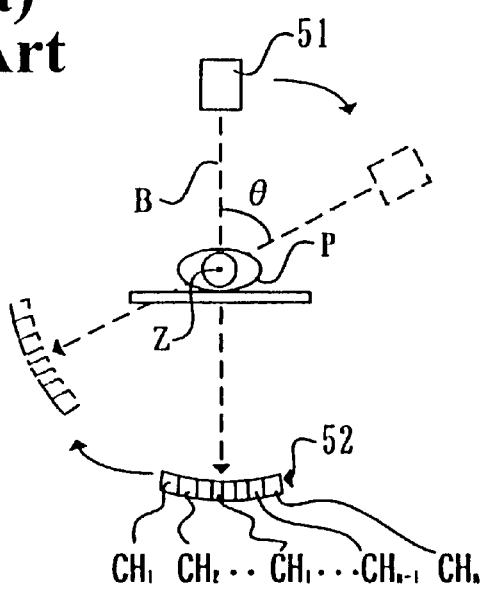
FIGS. 8(a), 8(b) and 8(c) are drawings showing a series of flows in a conventional image processing method.
Figure 8B:
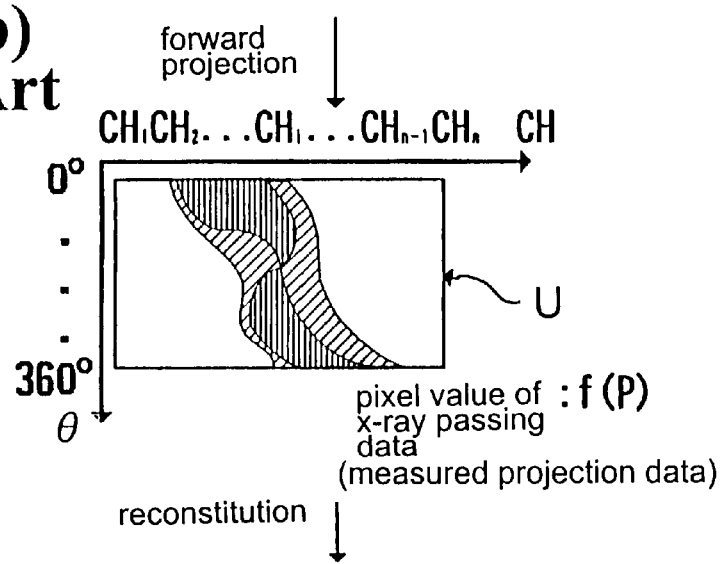
Figure 8C:
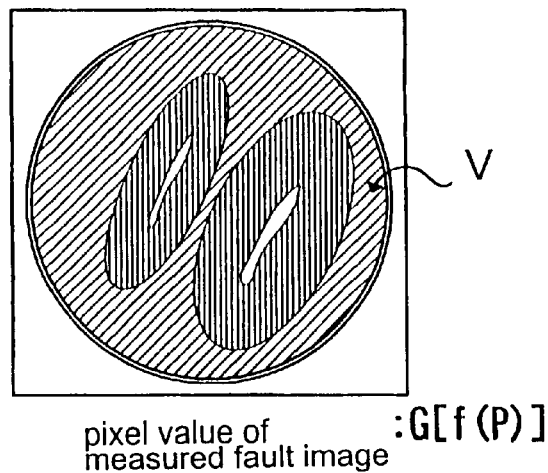
Figure 9:
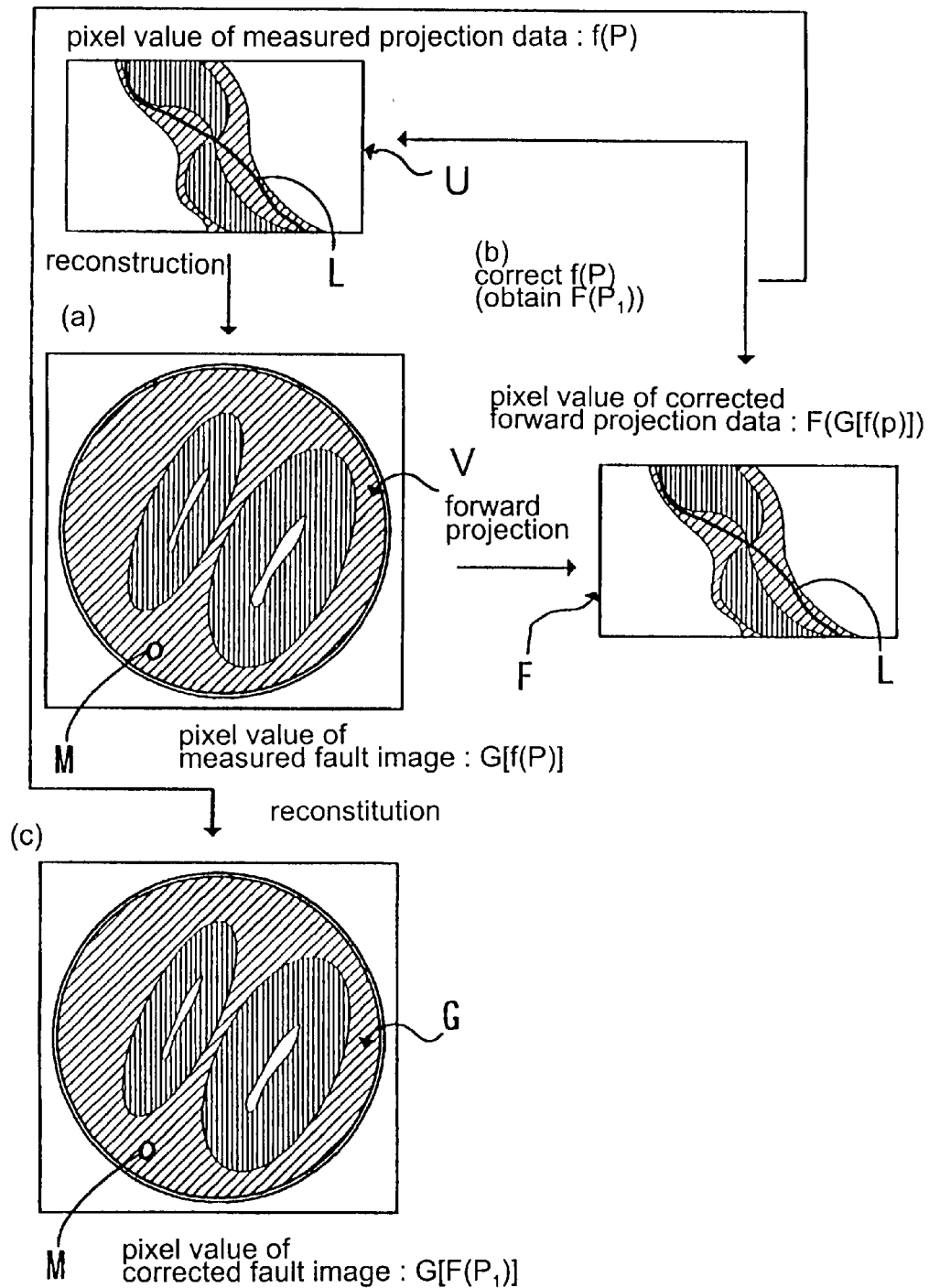
FIG. 9 is a drawing showing a series of flows of an image processing method in a conventional IRR method.
Figure 10:
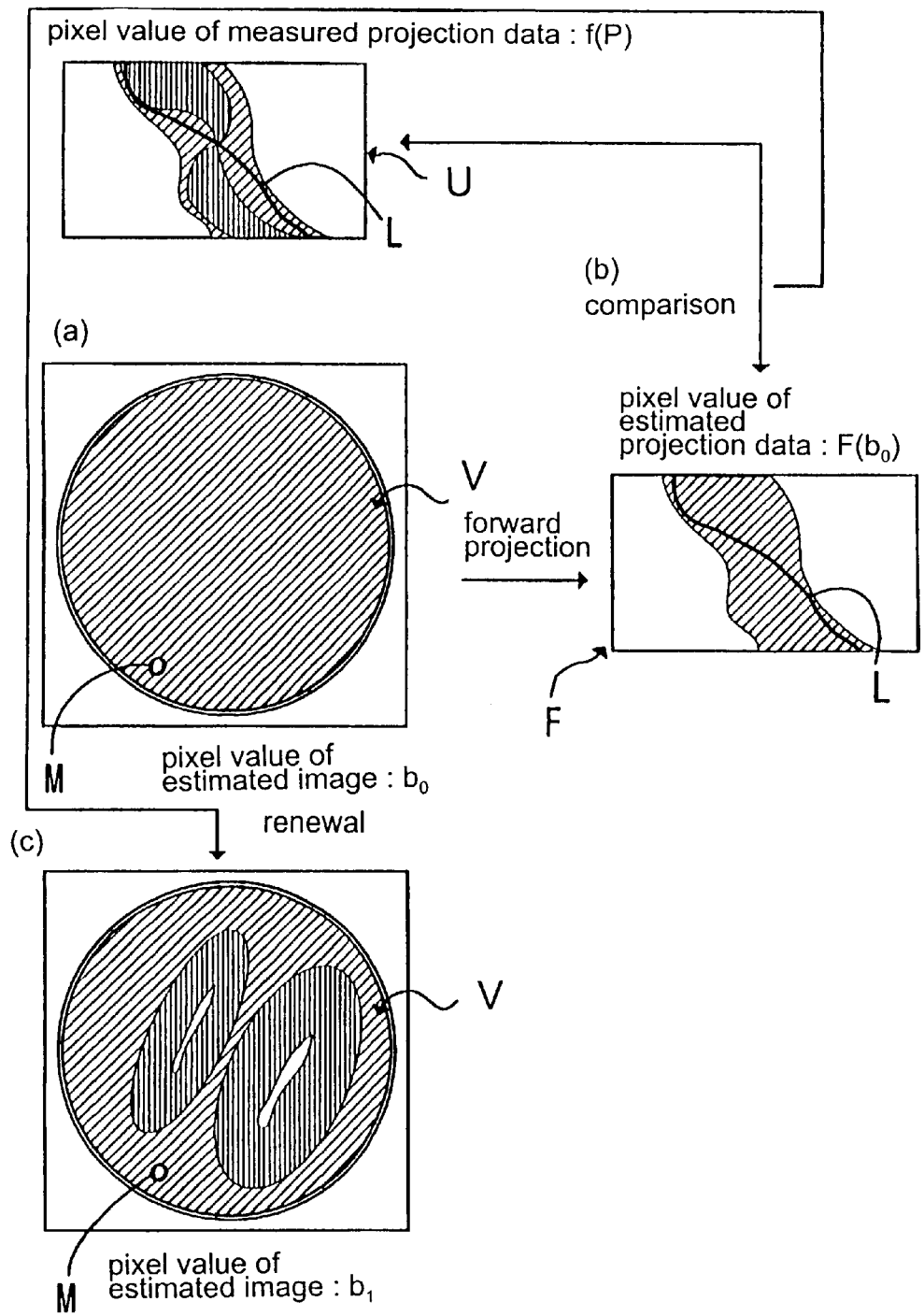
FIG. 10 is a drawing showing a method until an estimated image $b_1$ can be obtained by overwriting, one time, an estimated image $b_0$ in a conventional ART/EM method.
Figure 11:
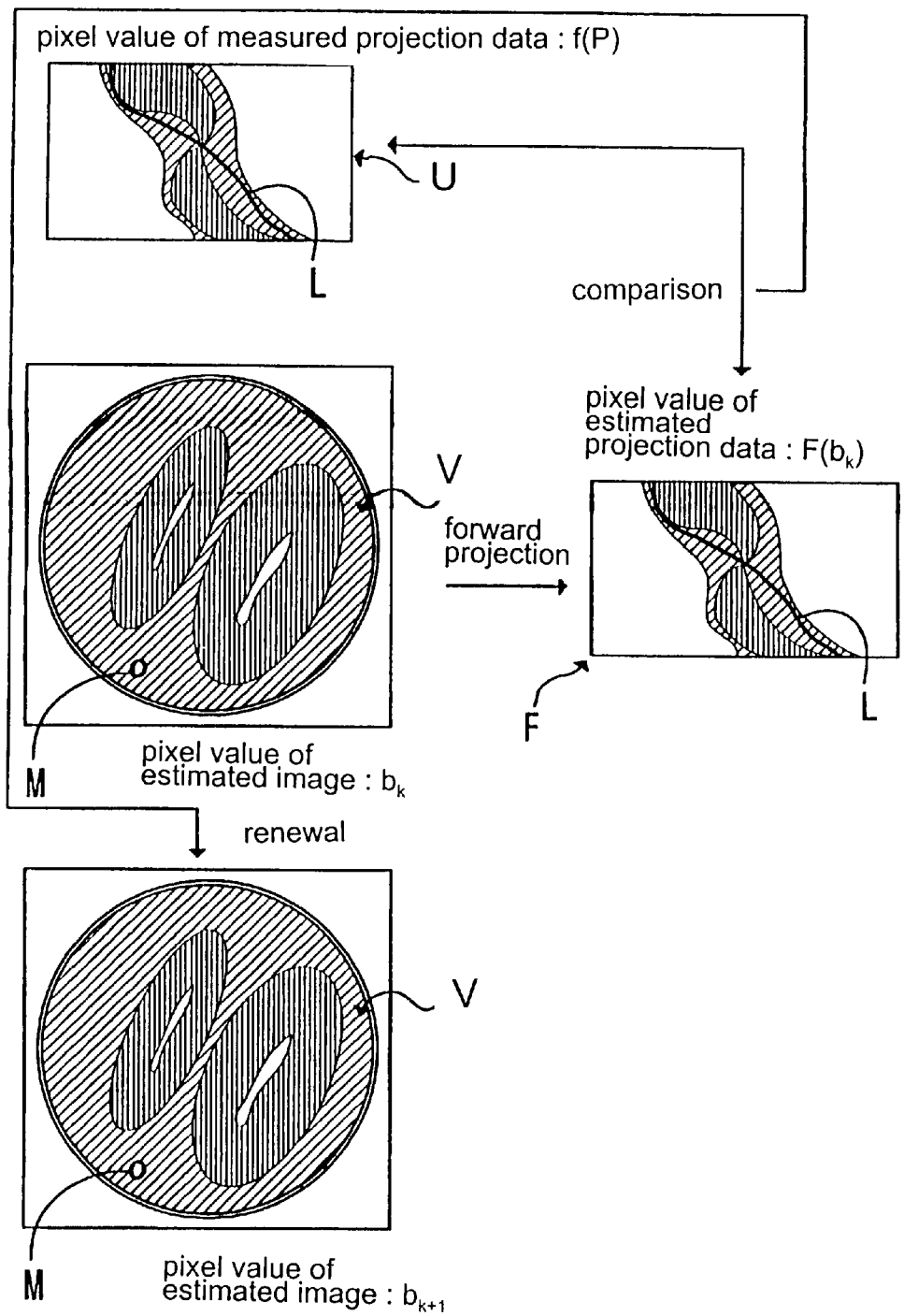
FIG. 11 is a drawing showing a method until an estimated image $b_{k+1}$ is obtained by further overwriting once the estimated image $b_k$ which was overwritten plural times in the conventional ART/EM method.

Next, a series of operations from the start of taking the image to obtaining a corrected image by the image processing method and the X-ray CT image-taking recording medium of the X-ray CT having the structure as described above are explained with reference to flow charts as shown in FIGS. 4 and 5 and the weighed ART/EM method as shown in FIGS. 6, 7(a) and 7(b). FIG. 4 is a first half of the flow chart showing a flow from the start of taking the image to obtaining the fault image. FIG. 5 is a latter half of the flow chart showing the flow from the start of taking the image to obtaining the corrected image. FIG. 6 is a diagram showing the ART/EM method and the weighed ART/EM method in tail. FIG. 7(a) is a diagram showing a relationship between the positions of paths passing through the high-absorber and weights, and FIG. 7(b) is a graph showing a relationship between weight functions and path lengths.

(Step S1) The X-ray transmission data f(P) of an object P to be tested which is collected by the data accumulating system (DAS) 7 is written in the forward projection data memory portion 22 through the control portion 3 as measured projection data f(P). Collection of the measured projection data f(P) corresponds to an image-taking process of the present invention.

(Step S2) The measured projection data f(P) read from the forward projection data memory portion 22 is reconstructed by the reconstruction portion 12. The reconstructed initial image is derived as the measured fault image G[f(P)] to be written in the fault image memory portion 21. Incidentally, the written-in measured fault image G[f(P)] is read from the fault image memory portion 21 through the control portion 3 to be displayed on the fault image display portion or monitor 8. The derivation and display of the measured fault image G[f(P)] correspond to a first image reconstruction process.

(Step S3) An estimated image $b_0$ is initially set with a suitable or predetermined value by an operator through an input operation of an operating portion 4 including a mouse, keyboard, touch panel and the like. When the initial image $b_0$ is set, the initial image is written in the fault image memory portion 21 through the control portion 3 from the estimated image setting portion 5 in the operating portion 4. The setting of the initial image $b_0$ corresponds to an estimated image setting process of the present invention.

(Step S4) The operator sets the high-absorber area M based on the measured fault image G[f(P)] through an input operation of the operating portion 4. When the high-absorber area M is set, the high-absorber area M is written in the fault image memory portion 21 through the control portion 3 from the high-absorber area setting portion 6 in the operating portion 4. The operator sets a portion which causes an artifact as the high-absorber area M. In other words, the operator sets the portion corresponding to the high-absorber as the high-absorber area M with reference to the measured fault image G[f(P)] on the image plane G displayed on the fault image display portion 8. Incidentally, the high-absorber area M may be directly set into the fault image display portion or monitor 8 through the input operation of the operating portion 4 including the mouse, keyboard, touch panel and the like. The setting of the high-absorber area M corresponds to a high-absorber area setting process of the present invention.

(Step S5) The initial image bo read out from the fault image memory portion 21 is forward projected by the forward projection portion 11. The forward projected data is derived on the projection plane F as the initial projection data $F(b_0)$ to be written in the forward projection data memory portion 22. At this time, the portion L where X-rays pass through the high-absorber area is formed on the projection plane F, and the respective coordinates of the portion L where X-rays pass through the high-absorber area are also written in the forward projection data memory portion 22. The derivation of the initial projection data $F(b_0)$ corresponds to an estimated projection data derivation process of the present invention.

(Step S6) The comparison reference image operation portion 14 compares the initial projection data $F(b_0)$ read from the forward projection data memory portion 22 and the measured projection data f(P) to derive or provide a comparison reference image $d_0$ through backprojection for a difference or ratio between the both data. The derived comparison reference image $d_0$ is written in the comparison reference image memory portion 23. The derivation of the comparison reference image $d_0$ corresponds to a comparison reference image derivation process of the present invention. Next, the derivation of the comparison reference image $d_0$ is explained together with the conventional ART/EM method.

In case an X-ray beam B is irradiated in a direction of an angle $\theta_j$ from the X-ray tube 1, as shown in FIG. 6, measured projection data $f(P_j)$ can be obtained on the projection plane F as the projection data, and at the same time, an image $B[f(P_j)]$ is formed on the image plane G as a reconstruction image. The image $B[f(P_j)]$ is obtained by backprojecting the measured projection data $f(P_j)$ and is not subjected to the filtering. The coordinates of the X-ray transmission data detected by a certain detection element $CH_i$ correspond to the coordinates $(CH_i, \theta_j)$ on the projection plane F. In the same manner, on the image plane G, there is formed a locus line H passing through a section of the object P to be tested and the detection element $CH_i$ in a direction of angle $\theta_j$. It is assumed that a pixel value of the coordinates $(CH_i, \theta_j)$ on the projection plane F relative to the measured projection data $f(P_j)$ is $f(P_{ij})$ and a pixel value of the coordinates $(CH_i, \theta_j)$ on the projection plane F relative to the estimated projection data F(b) is $F(b_{ij})$. At this time, in order to bring the pixel value $F(b_{ij})$ of the coordinates $(CH_i, \theta_j)$ on the projection plane F relative to the estimated projection data F(b) close to the pixel value $f(P_{ij})$ of the coordinates $(CH_i, \theta_j)$ on the projection plane F relative to the measured projection data $f(P_j)$, in the ART method, a difference $f(P_{ij})-F(b_{ij})$ as an addition value is added to the pixel value $F(b_{ij})$ of the coordinates $(CH_i, \theta_j)$, while in the EM method, the pixel value $F(b_{ij})$ of the coordinates $(CH_i,\theta_j)$ is integrated by a ratio $f(P_{ij})/F(b_{ij})$ as an integration value. The addition value $f(P_{ij})-F(b_{ij})$ or integration value $f(P_{ij})/F(b_{ij})$ is back-projected and divided by a pitch number N to obtain a comparison reference image. In the ART method, an overwritten estimated image becomes a sum of the estimated image prior to its overwriting and the comparison reference image, while, in the EM method, the overwritten estimated image becomes a product of the estimated image prior to its overwriting and the comparison reference image. Incidentally, in the present specification, the pitch number N is defined to be a value obtained by dividing the whole angle of the X-ray tube 1 and the X-ray detector 2 rotated when the CT image-taking is carried out by the rotated angle of the X-ray tube 1 and the X-ray detector 2 when one measurement is carried out. For example, in case the whole rotated angle of the X-ray tube 1 and X-ray detector 2 is 360° when the CT image-taking is carried out and the one measurement is carried out with 1° pitch by the X-ray tube 1 and the X-ray detector 2, the pitch number N can be obtained as 360°/1°= 360. The reason why the pitch number N is calculated based on per-unit-pitch-number is that in case the pitch number of rotation for the one measurement is different, a weight of the overwritten image is changed.

Also, in case $F(b_{ij})$ is changed to $f(P_{ij})$, as shown in FIG. 6, the image is changed altogether to the portion of the locus line H on the fault plane G. Therefore, repetition is required until the image converges. Also, in the conventional ART/ EM method, as described above, with respect to only the portion which does not pass through the high-absorber area, the measured projection data and the estimated projection data are compared and overwritten.

From the above, with reference to the portion which does not pass through the high-absorber area, according to the ART method, the comparison reference image $d_k$ is represented by equation (5); and according to the EM method, the comparison reference image dk is represented by equation (6), as described blow:

$$d_k=1/N \times B[f(P)-F(b_k)] \text{ (ART method)} \quad (5)$$

$$d_k=1/N \times B[f(P)/F(b_k)] \text{ (EM method)} \quad (6)$$

Therefore, in case of the conventional ART/EM method, the overwritten estimated image $b_{k+1}$ can be obtained, as below mentioned equations (7) and (8), by using the estimated image $b_k$ and the comparison reference image $d_k$ prior to the overwriting.

$$b_{k+1}=b_x+d_k \text{ (ART method)} \quad (7)$$

$$b_{k+1}=b_k \times d_k \text{ (EM method)} \quad (8)$$

As described above, in equation (7) of the ART method, the overwritten estimated image $b_{k+1}$ becomes a sum of the estimated image $b_k$ and comparison estimated image $d_k$ prior to the overwriting. In equation (8) for the EM method, the overwritten estimated image $b_{k+1}$ becomes a product of the estimated image $b_k$ and the comparison reference image $d_k$ prior to the overwriting. However, it should be noted that the above overwritten estimated image $b_{k+1}$ was overwritten according to the conventional ART/EM method, and overwritten estimated image $b_{k+1}$ according to the weighted ART/EM method, described later, is different therefrom.

(Step S7) According to a length of the path through which X-ray passes in the high-absorber, weighting of the comparison reference image $d_0$ is carried out to derive a weighted comparison reference image $e_0$. When the weighting of the comparison reference image $d_0$ is carried out, the comparison reference image $d_0$ read out from the comparison reference image memory portion 23 is weighted by the weighting operation portion 15. The weighted comparison reference image $e_0$ is written in the comparison reference image memory portion 23. The derivation of the weighted comparison reference image $e_0$ corresponds to a weighted comparison reference image derivation process of the present invention. Next, derivation of the weighted comparison reference image $e_0$ is explained together with the weighted ART/EM method.

In order to carry out weighting for an artifact portion, a weight function W(L) is introduced as shown in FIG. 7(b). The weight function W(L) is a function with respect to a length L of a path through which X-ray passes in the high-absorber. The relationship between a position of the path and a weight is shown in FIG. 7(a). More specifically, in case X-rays do not pass through the high-absorber area and the length of the path is denoted as $L_0$, $L_0$ becomes 0 and $W(L_0)$ becomes 1. In case X-ray passes through the high-absorber area and its path length is $L_1$, $W(L_1)$ becomes less than 1. Also, in case X-ray passes through the high-absorber area, its path length is $L_2$ and the path length $L_2$ is larger than the path length $L_1$, in other words, in case the transmission area of the high-absorber is longer than $L_1$, $W(L_2)$ is smaller than $W(L_1)$. From the above, $0=L_0<L_1<L_2$ and $1=W(L_0)>W(L_1)>W(L_2)$ are satisfied. In other words, as the transmission area of the high-absorber becomes longer, absorption or dispersion of the high-absorber becomes larger and the artifact due to the absorption or dispersion become large, which means that the weight becomes light. Conversely, as the transmission area of the high absorber becomes shorter, the artifact due to the absorption or dispersion becomes smaller, which means that the weight becomes heavy. Next, derivations of the weighted comparison reference image $e_0$ and the overwritten estimated image $b_1$ are explained by using the equation of the weight function W(L) (hereinafter, if applicable, abbreviated as "W").

In case the projection data is represented by $\beta$ and a backprojection considering the weighting (hereinafter, if applicable, abbreviated as "weighted backprojection") is represented by $B_1(\beta)$, the weighting function W, backprojection $B(\beta)$ and weighted backprojection $B_1(\beta)$ are expressed by following equation (9).

$$B_1(\beta) = B(W\beta) \times \text{Const.} \tag{9}$$

Incidentally, "Const." is a constant. The value obtained through the weighted backprojection is different from the original value obtained through the normal backprojection. Therefore, in order to make the same value as the original value, the constant is multiplied.

From the above, when considering the whole area including the portion L where X-rays pass through the high-absorber area, the weighted comparison reference image $e_k$, according to the ART method, is expressed by equation (10), and according to the EM method, it is expressed by equation (11), as follows:

$$e_k = 1/N \times B_1[f(P) - F(b_k)] = \text{Const.}/N \times B(W \times [f(P) - F(b_k)])$$
(ART method) (10)

$$e_k = 1/N \times B_1[f(P)/F(b_k)] = \text{Const.}/N \times B(W \times [f(P)/F(b_k)])$$
(EM method) (11)

Therefore, in case of the weighted ART/EM method, the overwritten estimated images $b_{k+1}$ can be obtained from below mentioned equations (12) and (13) by using the estimated image $b_k$ and weighted comparison reference image $e_k$ prior to the overwriting.

$$b_{k+1} = b_k + e_k \text{ (ART method)} \tag{12}$$

$$b_{k+1} = b_k \times e_k \text{ (EM method)} \tag{13}$$

However, it should be noted that the above overwritten estimated image $b_{k+1}$ is overwritten by the weighted ART/EM method and is different from the overwritten estimated image $b_{k+1}$ overwritten according to the conventional ART/EM method described before.

(Step S8) The initial image $b_0$ read out from the fault image memory portion 21 is overwritten by the weighted comparison reference image $e_0$ read out from the comparison reference image memory portion 23. In other words, the initial image $b_0$ is overwritten by the fault image overwriting portion 16, i.e. the above-mentioned weighted ART/EM method. The overwritten estimated image is obtained as the estimated image $b_1$ to be written in the fault image memory portion 21. Incidentally, the written-in overwritten estimated image $b_1$ is read out from the fault image memory portion 21 through the control portion 3 to be displayed on the fault image display portion or monitor 8. The derivation and display of the overwritten estimated image $b_1$ correspond to the estimated image overwriting process of the present invention.

(Step S9) With reference to the overwritten estimated image $b_1$ displayed on the fault image display portion 8, the operator determines whether the overwritten estimated image $b_1$ becomes a corrected image for reducing the artifact. Here, the aforementioned corrected image may have a low contrast. In case it is determined that the overwritten estimated image $b_1$ becomes the aforementioned corrected image, the process advances to Step 10. In case it is determined that the overwritten estimated image $b_1$ does not become the aforementioned corrected image, the process returns to Step S5 to repeat the process from Step 5 to Step S9 to overwrite the estimated image $b_1$ in the same manner as in the overwriting of the initial image $b_0$. Thereafter, until it is determined that the overwritten estimated image $b_1$ becomes a corrected image for reducing the artifact, the process from Step S5 to Step S9 are repeated to obtain the comparison reference image $d_k$, weighted comparison reference image $e_k$ and the estimated image $b_{k+1}$ which is obtained by further overwriting one time, from the estimated image $b_0$ (overwriting of k times). Incidentally, repetition of the processes from Step S5 to Step S9 corresponds to a repeating operation process of the present invention.

In case the number of repetition is small, when compared with the conventional ART/EM method, the estimated image $b_{k+1}$ obtained by the above weighted ART/EM method has a reproducibility for a shape of the high-absorber itself and its circumferential portion, and an effect for reducing the artifact though it has a low contrast.

As described before, in case the number of repetition of the processes from Step S5 to Step S9 (overwriting times), i.e. the number of the repetition time, is small, the estimated image $b_{k+1}$ becomes a corrected image having a high reducing effect for reducing the artifact though the image has a low contrast. On the contrary, in case the number of repetition time is large, though the estimated image $b_{k+1}$ has a high contrast, the image becomes a corrected image having a low artifact reducing effect. However, by combining the IRR method including steps S10 and S10, for the portion where X-rays pass through the high-absorber area, the measured projection data f(P) is replaced by an overwritten estimated projection data $F(b_{k+1})$ obtained by the weighted ART/EM method in case of a small repetition time to correct the measured projection data. Further, a reconstruction process is carried out by the FBP method or the ART/EM method to thereby obtain a high contrast image with reduced artifact. When compared with only the weighted ART/EM method, in order to obtain an image having a high contrast of the same degree, its repetition time as well as the artifact (including the shading artifacts) can be reduced.

(Step S10) The estimated image $b_{k+1}$ obtained at Step S9 is forward projected by the forward projection portion 11. The forward-projected data is derived as an overwritten estimated projection data $F(b_{k+1})$ to be written in the forward projection data memory portion 22. The derivation of the overwritten estimated projection data $F(b_{k+1})$ corresponds to an overwritten estimated projection data deriving process of the present invention.

(Step S11) The replacement correction portion 13 corrects the measured projection data f(P) to derive the corrected projection data $F(P_2)$ by using the measured projection data f(P) and overwritten estimated projection data $F(b_{k+1})$ read out from the forward projection data memory portion 22. The derived corrected projection data $F(P_2)$ is again written in the forward projection data memory portion 22. More specifically, for the portion L where X-rays pass through the high-absorber area, the pixel values of the measured projection data f(P) are replaced by pixel values according to the overwritten estimated projection data $F(b_{k+1})$ read from the forward projection data memory portion 22 to correct the measured projection data f(P). The derivation of the corrected projection data $F(P_2)$ corresponds to a measured projection data correction process of the present invention. Next, a method for deriving the corrected projection data $F(P_2)$ by correcting the measured projection data f(P) is explained in detail.

As an example for replacing the pixel values of the above-mentioned measured projection data f(P) with the pixel values according to the overwritten estimated projection data $F(b_{k+1})$ read out from the forward projection data memory portion 22 for the portion L where X-rays pass through the high-absorber area, there is a method for using therein the overwritten estimated projection data $F(b_{k+1})$ as they are for only the portion L where X-rays pass through the high-absorber area. In that case, the corrected projection data $F(P_2)$ can be obtained by equations (14) and (15) mentioned below.

In the portion where X-rays do not pass through the high-absorber area:

$$F(P_2)=f(P) \qquad (14)$$

In the portion L where X-rays pass through the high-absorber area:

$$F(P_2)=F(b_{k+1}) \qquad (15)$$

In the embodiment, although the overwritten estimated projection data $F(b_{k+1})$ for only the portion L where X-rays passes through the high-absorber area is used as they are, they may be replaced by the values obtained by multiplying for predetermined times, the respective overwritten estimated projection data $F(b_{k+1})$ for only the portion L where X-rays pass through the high-absorber area. For example, in case of replacing with a value $F(b_{k+1})$ obtained by multiplying a times to satisfy $0<\alpha<1$, above equation (14) can be replaced as equation (16).

In the portion where X-rays do not pass through the high-absorber area:

$$F(P_2)=\alpha \times F(b_{k+1}) \qquad (16)$$

When the replacement as shown by equation (16) is carried out, there can be obtained projection data where the artifact is further reduced.

(Step S12) The corrected projection data $F(P_2)$ read out from the forward projection data memory portion 22 is reconstructed at the reconstruction portion 12. The reconstructed corrected image is derived as a corrected image $P_3$ finally obtained in the present invention to be written in the fault image memory portion 21. Or, the corrected projection data $F(P_2)$ may be again subjected to the reconstruction process by the weighted ART/EM method at the comparison reference image operating portion 14, weighing operation portion 15 and the fault image overwriting portion 16 to derive the corrected image $P_3$ which is finally obtained. The derivation of the corrected image $P_3$ corresponds to a second image reconstruction process of the present invention. In other words, as described before, the final corrected image is derived through the reconstruction process by the FBP method, ART/EM method or the like.

Through the above-stated steps, in the image processing method and the X-ray CT having the X-ray CT image-taking recording medium, effects as described below can be obtained. That is, by the weighted ART/EM method which reduces the repeating time, the weighting is carried out by considering the data for the portion L, where X-rays pass through the high-absorber area. Therefore, there can be obtained the correct image where the high-absorber and its circumferential portion are reproduced in spite of a low contrast and the artifact is reduced. Also, the false image of the object to be tested can be corrected by the IRR method by using the fault image obtained by the weighted ART/EM method where the number of repeating time is reduced, and the fault image of the object to be tested. From the method described before, since the data obtained for the high-absorber portion become more accurate than the correction data obtained by the normal IRR method, effects thereof are not limited. Also, in case an image having the same degree of the contrast as that of the image obtained by the weighted ART/EM method is obtained, the number of repeating time as well as the artifacts (also including a shading artifact) can be reduced.

As described in detail hereinabove, according to the image processing method of the X-ray CT of the first aspect of the invention, the correct image having the high contrast and reduced artifact can be obtained by replacing the measured projection data at the portion where X-rays pass through the high-absorber area with the data according to weighted overwritten estimated projection data to thereby correct and reconstitute the measured projection data.

According to the X-ray CT of the second aspect of the invention, the correct image having the high contrast and reduced artifacts can be obtained since the X-ray CT can be preferably carried out by the first aspect of the invention.

According to the X-ray CT image-taking recording medium of the third aspect of the invention, the correct image having reduced artifact and the high contrast can be obtained by carrying out the method of the first aspect of the invention with a computer.

While the invention has been explained with reference to the specific embodiments of the invention, the explanation is illustrative and the invention is limited only by the appended claims.

What is claimed is:

1. An image processing method for obtaining a fault image by reconstructing image data obtained by an X-ray CT, comprising:
   an image-taking process for obtaining measured projection data by irradiating X-rays from a circumference of an object to be tested and detecting the X-rays passing through the object to be tested;

a first image reconstructing process for reconstructing an initial image by subjecting the measured projection data obtained in said image-taking process to filtering and then backprojecting the filtered measured projection data;

an estimated image setting process for setting an estimated image with a predetermined value;

a high-absorber area setting process for setting a high-absorber area based on the initial image derived from the first image reconstructing process;

an estimated projection data derivation process for deriving estimated projection data by forward projecting the estimated image in an X-ray irradiation direction;

a comparison reference image deriving process for deriving a comparison reference image by backprojecting one of a difference and a ratio between the estimated projection data and the measured projection data;

a weighting comparison reference image deriving process for deriving a weighted comparison reference image weighted such that as a path through which X-rays pass in the high-absorber area becomes longer, pixel values of the comparison reference image become smaller;

an estimated image overwriting process for overwriting the estimated image by the weighted comparison reference image;

an overwritten estimated projection data deriving process for deriving overwritten estimated projection data through the forward projection of the estimated image overwritten at the estimated image overwriting process;

a measured projection data correction process for replacing the measured projection data at a portion where the X-rays pass through the high-absorber area with data according to the overwritten estimated projection data to correct the measured projection data; and a second image reconstructing process for reconstructing an image of the corrected measured projection data to derive the fault image.

2. An image processing method according to claim 1, wherein after said estimated image overwriting process, said estimated projection data derivation process, said comparison reference image deriving process and said weighting comparison reference image deriving process are repeated at least once to reduce an artifact according to the artifact appearing on the estimated image overwritten at the estimated image overwriting process.

3. An X-ray CT device for obtaining a fault image by reconstructing image data, comprising:

an X-ray irradiation device for irradiating X-rays from a circumference of an object to be tested to allow the X-rays to pass through paths in the object;

an X-ray detecting device for obtaining measured projection data by detecting the X-rays irradiated from the X-ray irradiation device and passing through the object to be tested;

a first image reconstructing device electrically connected to the X-ray detecting device for reconstructing an original image by subjecting the measured projection data obtained by the X-ray detecting device to filtering and then backprojecting filtered measured projection data;

an estimated image setting device for setting an estimated image with a predetermined value;

a high-absorber area setting device electrically connected to the first image reconstructing device for setting a high-absorber area on the measured fault image derived from the first image reconstructing device;

an estimated projection data deriving device electrically connected to the estimated image setting device for deriving estimated projection data by forward projecting the estimated image in an X-ray irradiation direction;

a comparison reference image deriving device electrically connected to the X-ray detecting device and the estimated projection data deriving device for deriving a comparison reference image with pixel values by backprojecting one of a difference and a ratio between the estimated projection data and the measured projection data;

a weighing comparison reference image deriving device electrically connected to the comparison reference image deriving device for deriving a weighted comparison reference image weighted such that the pixel values in the comparison reference image become smaller as one of the paths through which the X-rays pass in the high-absorber area becomes longer;

an estimated image overwriting device electrically connected to the estimated image setting device and weighing comparison reference image deriving device for overwriting the estimated image by the weighted comparison reference image;

an overwriting estimated projection data deriving device electrically connected to the estimated image overwriting device for deriving overwritten estimated projection data by forward projecting the overwritten estimated image;

a measured projection data correcting device electrically connected to the X-ray detecting device and the overwriting estimated projection data deriving device for correcting the measured projection data by replacing the measured projection data at a portion through which the X-rays pass in the high-absorber area by data according to the overwritten estimated projection data; and a second image reconstructing device electrically connected to the measured projection data for deriving the fault image by reconstructing an image of the corrected measured projection data.

4. An X-ray CT device according to claim 3, further comprising a repeating operation device electrically connected to the estimated projection data deriving device for overwriting the estimated image such that an artifact is reduced by repeatedly carrying out the processes of the estimated projection data deriving device, the comparison reference image deriving device, the weighing comparison reference image deriving device and the estimated image overwriting device at least two times according to the artifact appearing on the estimated image overwritten by the estimated image overwriting device.

5. An X-ray CT image-taking recording medium to be read by a computer, containing a program for executing the image process method comprising:

an image-taking process for obtaining measured projection data by irradiating X-rays from a circumference of an object to be tested and detecting the X-rays passing through the object to be tested;

a first image reconstructing process for reconstructing a measured initial image by subjecting the measured projection data obtained in said image-taking process to filtering and then backprojecting the filtered measured projection data;

an estimated image setting process for setting an estimated image with a predetermined value;

a high-absorber area setting process for setting a high-absorber area based on the measured fault image derived from the first image reconstructing process;

an estimated projection data derivation process for deriving estimated projection data by forward projecting the estimated image in an X-ray irradiation direction;

a comparison reference image deriving process for deriving a comparison reference image by backprojecting one of a difference and a ratio between the estimated projection data and the measured projection data;

a weighting comparison reference image deriving process for deriving a weighted comparison reference image weighted such that as a path through which X-rays pass in the high-absorber area becomes longer, pixel values of the comparison reference image become smaller;

an estimated image overwriting process for overwriting the estimated image by the weighted comparison reference image;

an overwritten estimated projection data deriving process for deriving overwritten estimated projection data through the forward projection of the estimated image overwritten at the estimated image overwriting process;

a measured projection data correction process for replacing the measured projection data at a portion where the X-rays pass through the high-absorber area with data according to the overwritten estimated projection data to correct the measured projection data; and a second image reconstructing process for reconstructing an image of the corrected measured projection data to derive the fault image.

6. An X-ray CT image-taking recording medium according to claim 5 wherein after said estimated image overwriting process, the estimated projection data derivation process, the comparison reference image deriving process and the weighing comparison reference image deriving process are repeated at least once to reduce an artifact according to the artifact appearing on the estimated image overwritten at the estimated image overwriting process.

* * * * *